United States Patent

[11] 3,602,258

[72] Inventors Aldo Gnavi;
 Giacomo Di Bartolomeo, both of Turin, Italy
[21] Appl. No. 13,406
[22] Filed Feb. 24, 1970
[45] Patented Aug. 31, 1971
[73] Assignee Compagnia Italiana Westinghouse Freni E Segnali an Italian Joint Stock Company Turin, Italy
[32] Priority Feb. 25, 1969
[33] Italy
[31] 50 723-A/69

[54] AUTOMATIC CONNECTOR DEVICES FOR SERVICE CONDUITS IN RAILWAY VEHICLE COUPLINGS
12 Claims, 10 Drawing Figs.

[52] U.S. Cl. .................................................... 137/594, 285/63, 285/137
[51] Int. Cl. .................................................... F16k 11/10, F16l 39/00
[50] Field of Search .......................................... 285/25, 26, 63, 65, 137; 137/594

[56] References Cited
UNITED STATES PATENTS
1,463,261 7/1923 Funk ............................. 285/63
3,381,977 5/1968 Metzger ....................... 285/26

Primary Examiner—Henry T. Klinksiek
Attorney—Sughrue, Rothwell, Mion, Zinn & MacPeak ABSTRACT: In an automatic railway vehicle coupling, automatic connectors for service conduits such as pneumatic lines and electrical conductors are provided, each coupling head carrying a respective connector member which is pivotally suspended from the head for swinging movement to permit accurate alignment of the connector members when the heads are coupled.

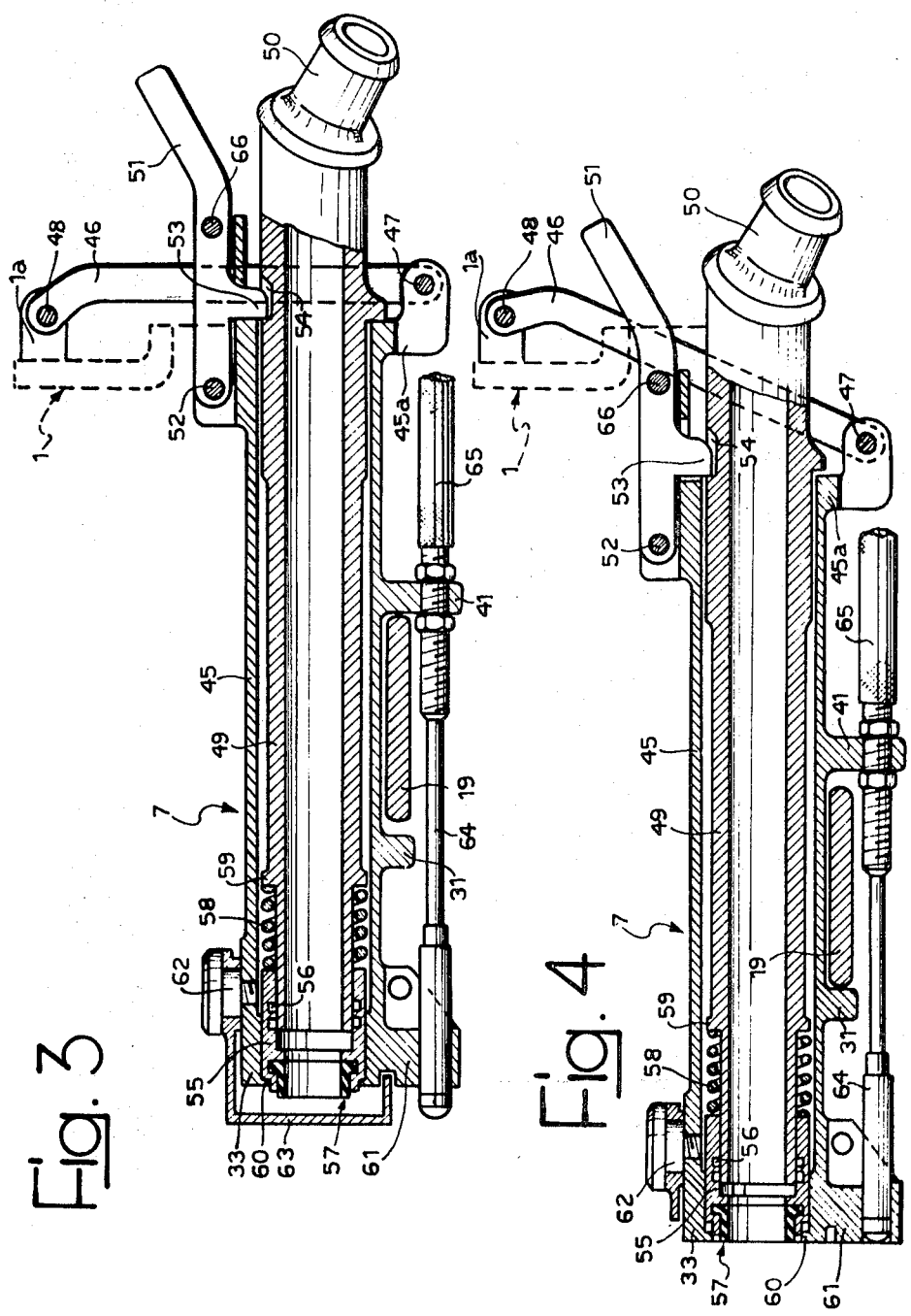

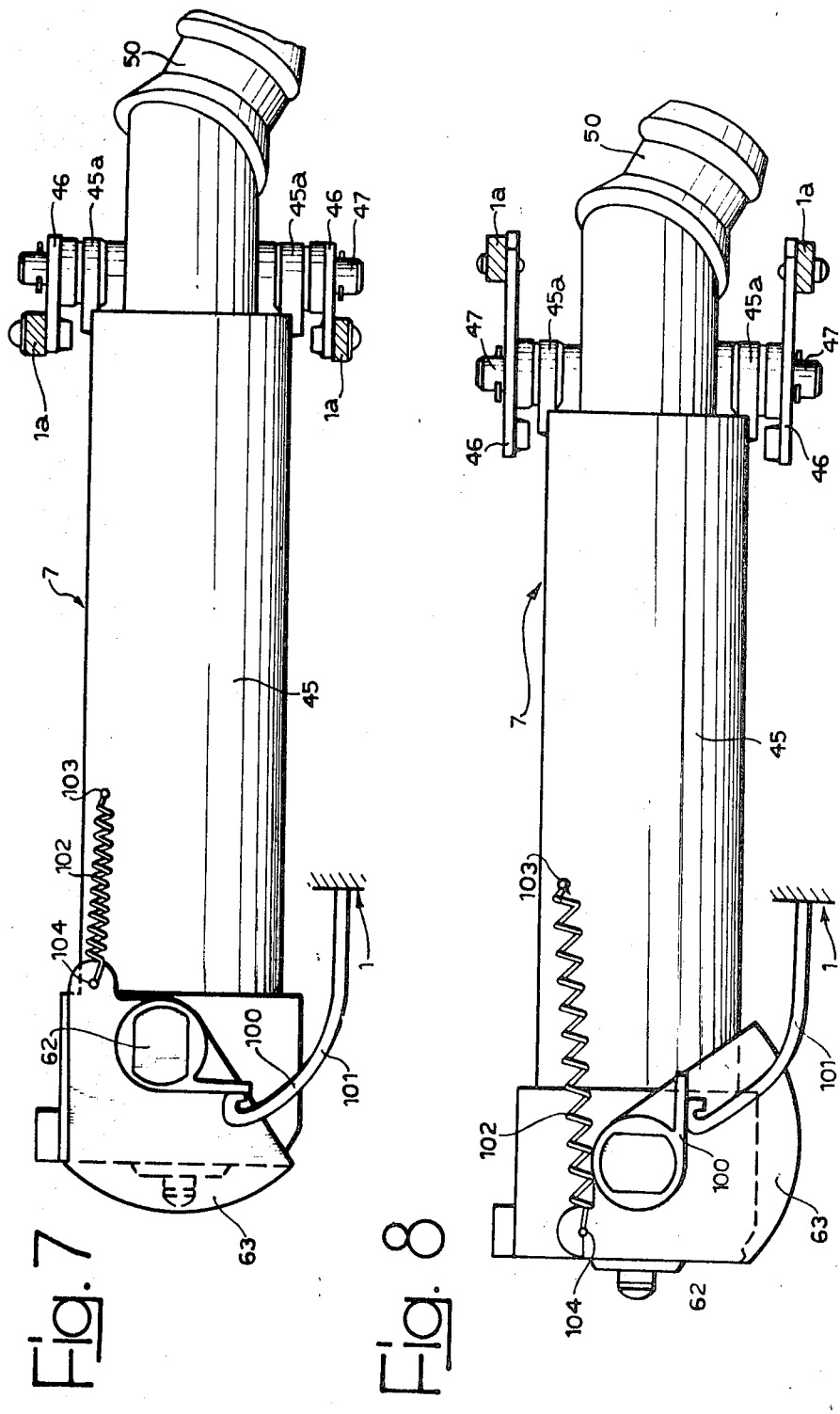

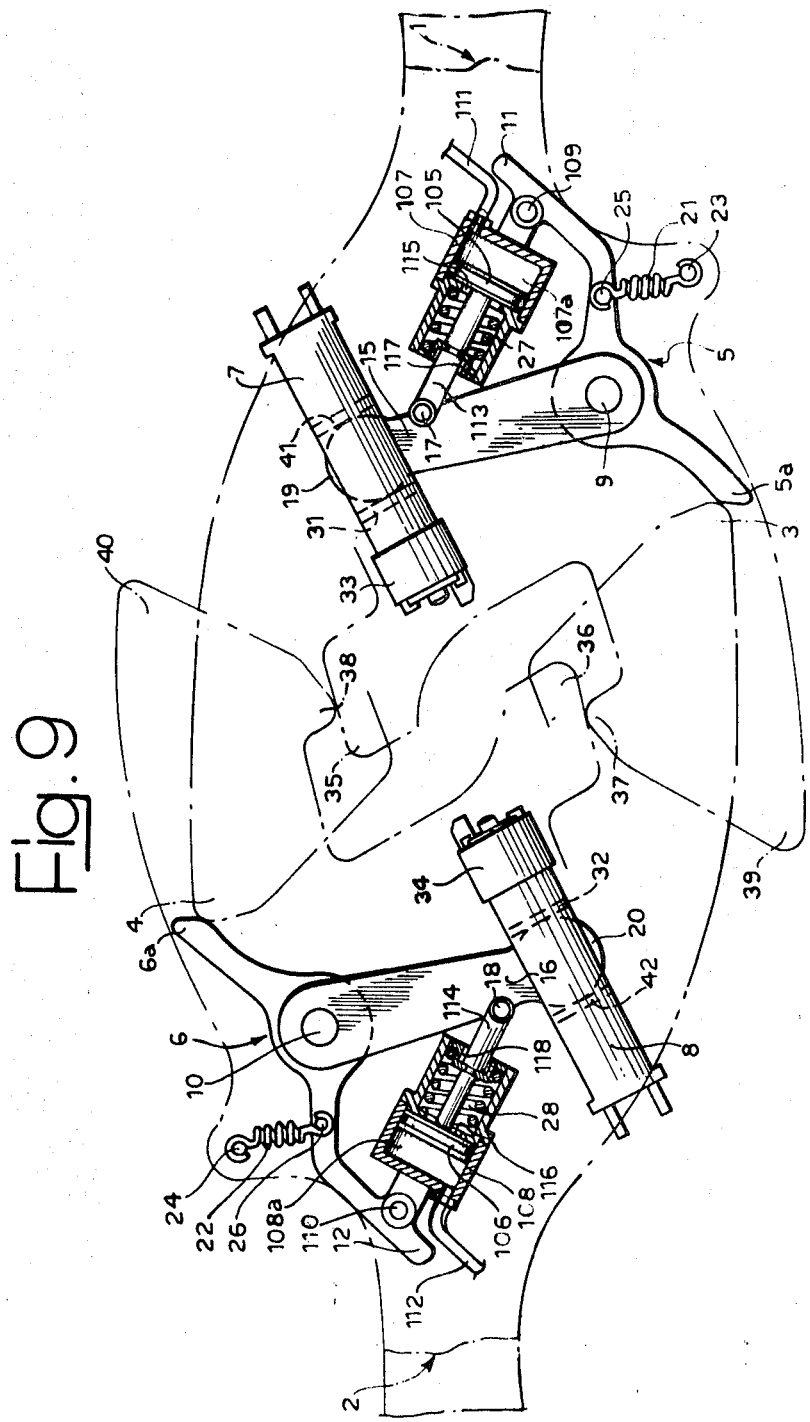

AUTOMATIC CONNECTOR DEVICES FOR SERVICE CONDUITS IN RAILWAY VEHICLE COUPLINGS

This invention relates to automatic connector devices for effecting automatic service conduit connections in association with automatic railway vehicle couplings.

It is well known that one of basic requirements for effecting completely automatic coupling of railway vehicles in European yards is the automatic interconnection of service conduits such as pneumatic pipes and electrical cables, without any manual assistance. Among the elementary operations which should take place automatically upon coupling two railway vehicles are the following: (a) mechanical coupling with both traction and buffer action; (b) interconnection of service conduits such as pneumatic and vacuum pipes and electrical cables, and (c) opening and closing of cocks in vacuum and pneumatic pipes.

A condition which has been laid down for European push/pull automatic couplings is that they should be capable of direct coupling to the SA3 coupling as used in the U.S.S.R., having the Willison profile, which has been known since 1915.

An object of the present invention is to provide an automatic connector device which is capable of connecting two pneumatic pipes and electrical cables between two vehicles and which is capable of operating in conjunction with a mechanical push/pull coupling of the Willison type.

A further object is to provide a connector device as aforesaid in which automatic opening and closing of cocks in the pneumatic pipes of the connector is effected.

As is known, the coupling together of two automatic coupling heads of the Willison profile is accompanied, a little before coupling takes place, by a lateral movement of each head by about 50 mm. This movement adds to the difficulty of effecting perfect interconnection of the service conduits such as pneumatic pipes and electrical cables associated with the head.

Connector devices which have hitherto been proposed for automatic couplings have not proved entirely satisfactory in practice insofar as forward movement of the coupling heads towards each other upon interengagement is accompanied by considerable relative displacement of the interengageable members of the service conduit connectors, in particular the end seals of the pneumatic pipes. Consequently these members are subjected to considerable wear during the automatic coupling and uncoupling movements, and in the case of end seals, are vulnerable to the action of corrosive agents in the atmosphere, with an adverse effect on their operation.

A particular object of this invention is to provide a connector device as aforesaid in which relative movement between the connector members is reduced upon coupling and uncoupling.

The connector device of the invention is accordingly characterized by including at least one connector member connected to the respective coupling head by a pivotal suspension having resilient centering means.

The invention will now be described, by way of nonlimiting example, with reference to the accompanying drawings, in which:

FIGS. 3 and 4 are axial sections of the connector member for the pneumatic brake conduits in the connector device of the invention, with associated automatic cocks, in their uncoupled and fully coupled conditions, as shown in FIGS. 1 and 2 respectively;

Figure 1:
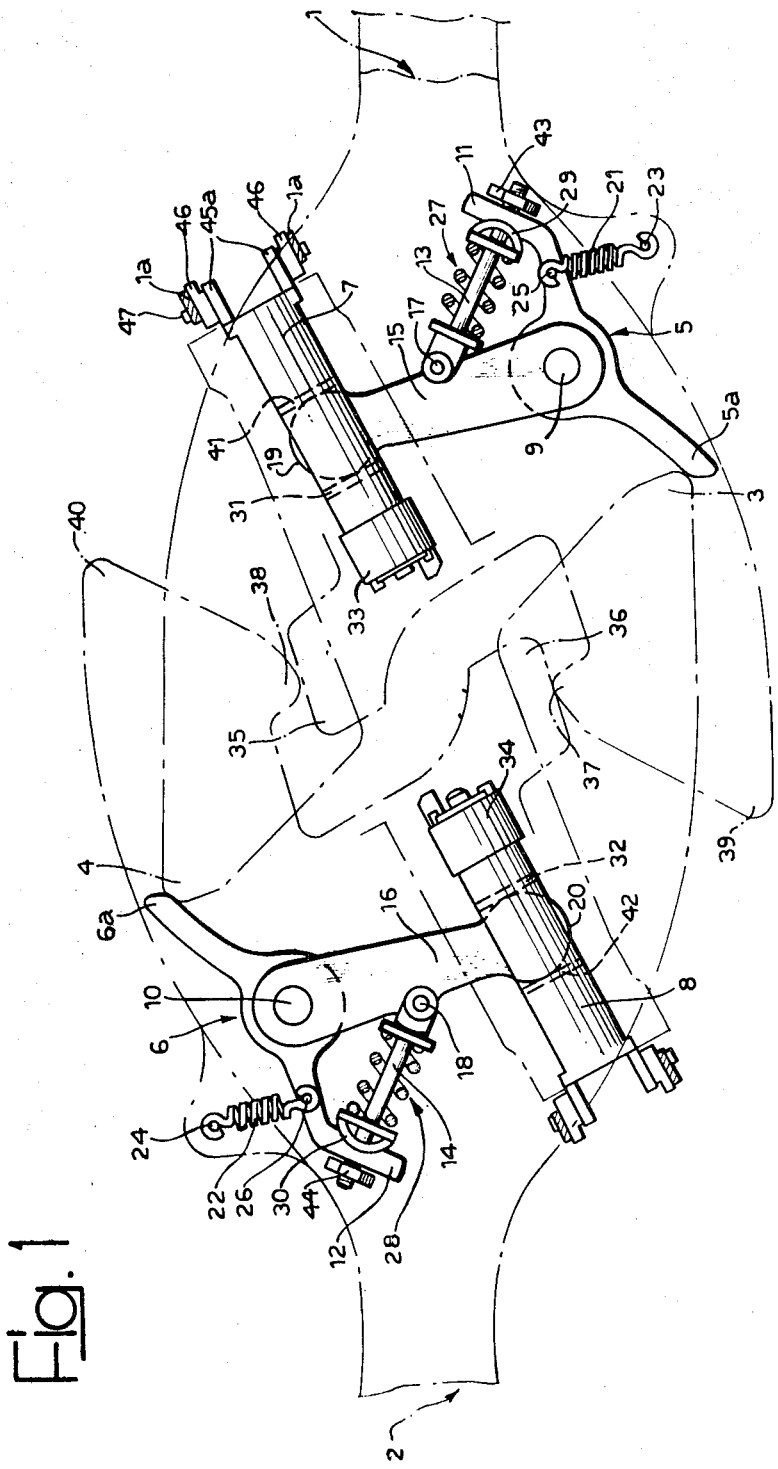
FIG. 1 is a diagrammatic plan view of an automatic coupling for railway vehicles incorporating automatic connector devices according to the invention, in its uncoupled condition, at the commencement of the coupling operation.
Figure 2:
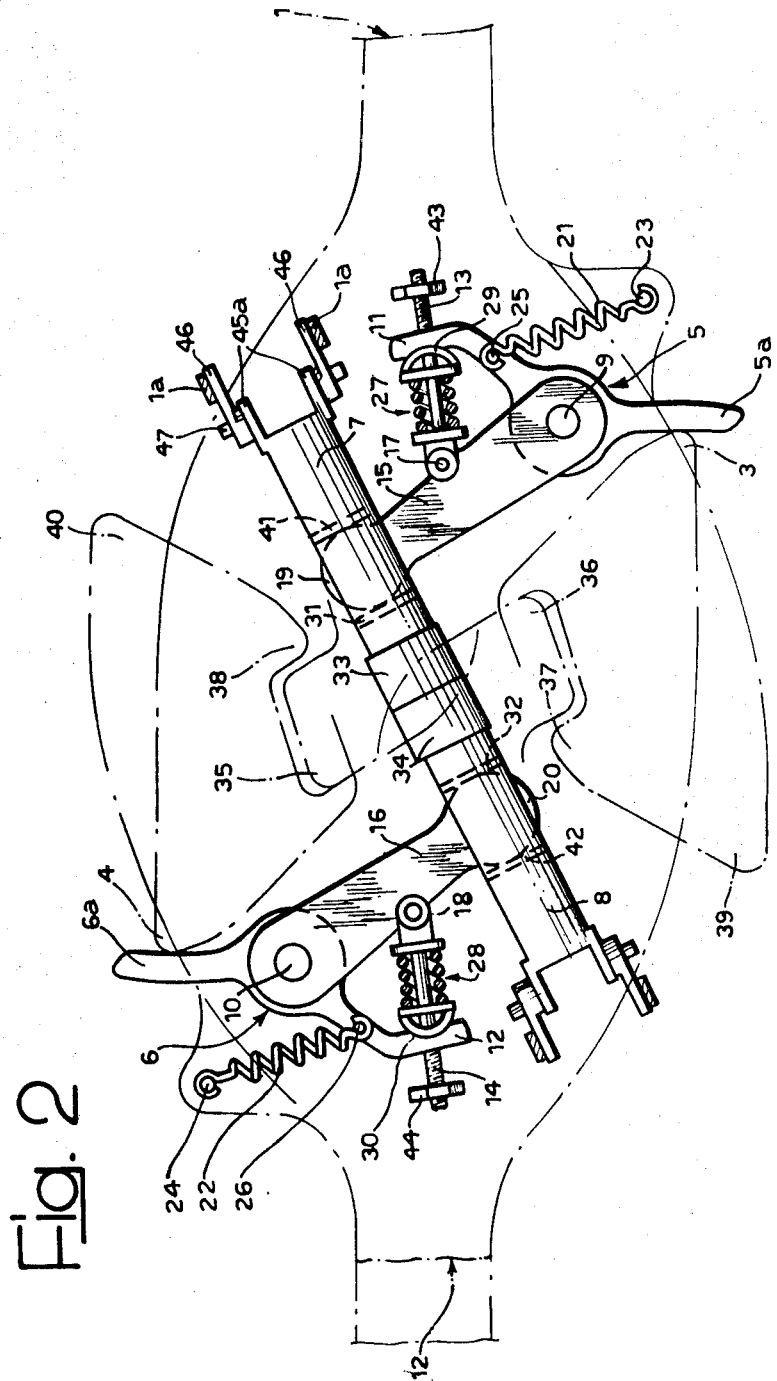
FIG. 2 is a plan view of the coupling of FIG. 1 in its fully coupled condition, when transmitting thrust.
Figure 10:
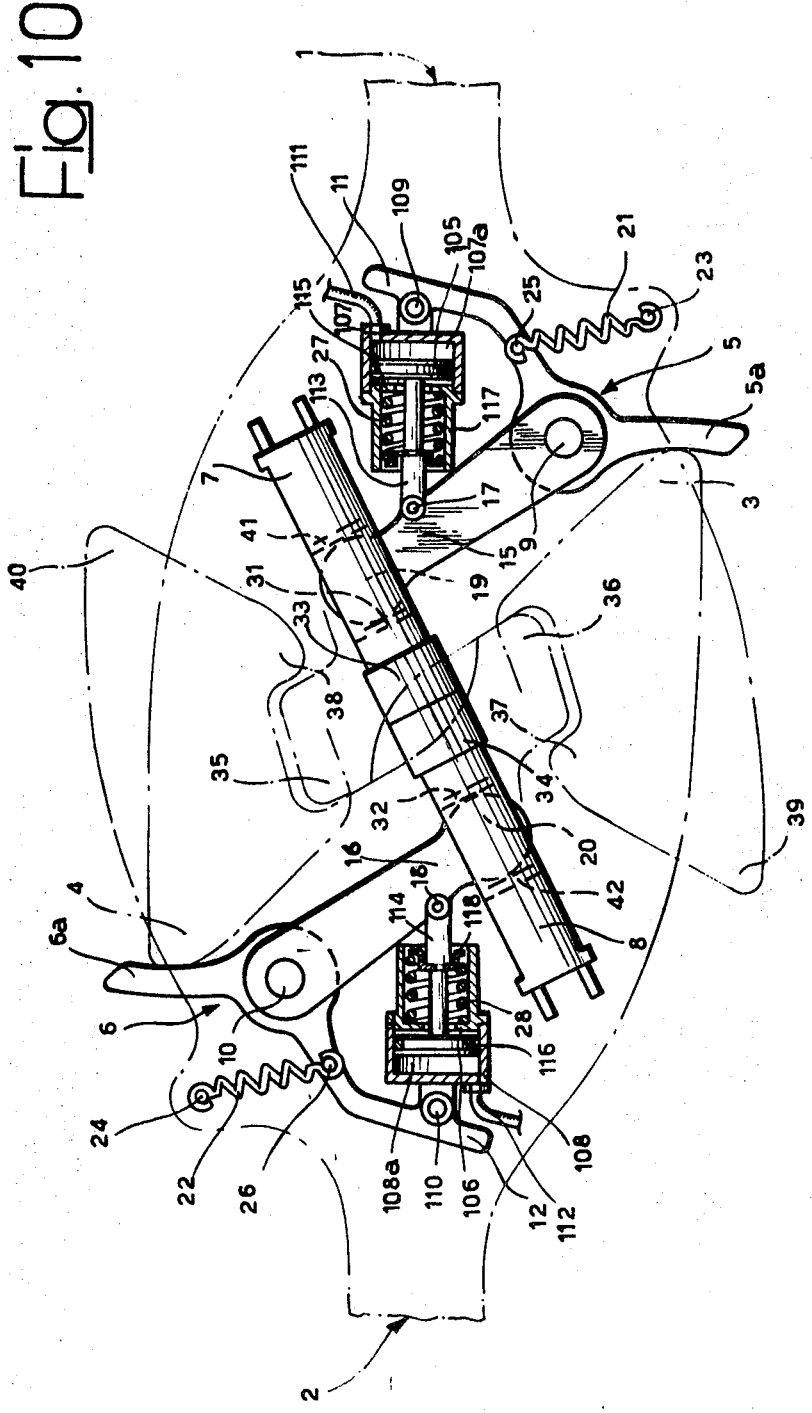

FIGS. 7 and 8 are plan views of the coupling device showing the protective means of the end of the device in its closed and open positions respectively; and FIGS. 9 and 10 are plan views of an automatic coupling incorporating connector devices of the invention, showing a modification of the coupling of FIGS. 1 and 2, shown in the uncoupled and fully coupled conditions respectively.

The mode of operation of the automatic coupling shown in FIGS. 1 and 2 will first be described.

During the initial phase of the coupling operation respective forward projections 3, 4 of the heads 1, 2 of two approaching railway vehicles make contact with external arms 5a, 6a of sensing levers 5, 6 pivotally mounted on the heads 1, 2 by respective pivot pins 9, 10, rotating the sensing levers 5, 6 anticlockwise as viewed, against the action of respective biassing springs, 21, 22. Such rotation of the sensing levers, 5, 6 causes anticlockwise rotation about said pivot pins 9, 10 of operating levers 15, 16 through respective springs 27, 28 surrounding guide rods 13, 14 pivoted to the said levers 15, 16 by pivot pins 17, 18 and slidable in forked ends of respective arms 11, 12 of the sensing lever 5, 6. The operating lever 15, 16 have rounded free ends 19, 20 located between external shoulders 31, 41 and 32, 42 formed on respective connector members 7, 8, and the anticlockwise rotation of the operating levers 15, 16 brings the ends 19, 20 into abutment with the shoulders 31, 32 to advance the connector members 7, 8 relative to the coupling heads 1, 2.

During this advancing movement of the connector members 7, 8 the springs 27, 28 maintain respective stop nuts 43, 44 carried on the free ends of the guide rods 13, 14 against the sensing lever arms 11, 12 until respective ends 33, 34 of the connector members 7, 8 are brought into mutual engagement to interconnect the conduits carried thereby. Further anticlockwise rotation of the sensing levers 5, 6 after the connector members 7, 8 have interengaged causes compression of the springs 27, 28 between the lever arms 11, 12 and the operating levers, 15, 16 until the coupling is in the condition shown in FIG. 2, when the coupling heads 1, 2 are fully interengaged.

During the mechanical coupling heads 1, 2 on the vehicles to be coupled, respective protuberances 35, 36 thereon impinge on respective cooperating impact faces which are inclined to the direction of approach. After such impact further advance of the coupling heads, 1, 2 towards each other is accompanied by lateral displacement of the heads in opposite directions, to locate the protuberances behind respective inwardly projecting noses 38, 37 of the heads 2, 1 respectively when the coupling heads are fully coupled and latched together: these parts of the coupling heads act in a different plane from the projections 3, 4 and the sensing levers 5, 6.

The above-mentioned mechanism for advancing the connector members 7, 8 of the interengaging coupling heads 1, 2 towards each other is so arranged that when the lateral displacement of the coupling heads in the final phase of the coupling operation is almost completed the respective connector members are coaxially aligned with each other. This avoids relative lateral shifting of the ends 33, 34 of the connector members 7, 8 when the latter are moved into engagement with each other. When the fully interengaged coupling heads 1, 2 are placed under thrust by buffer action between the coupled vehicles the heads and the control mechanism for the connector members remain in the relative positions of FIG. 2, except that the lateral clearances between the protuberances 36, 35 and the respective projections 4, 3 of the heads 1, 2 are taken up by the springs 27, 28.

When the coupled vehicles are uncoupled the coupling heads 1, 2 disengage from one another by the control of appropriate latches. Upon disengagement and movement apart of the heads 1, 2 the projections 4, 3 move away from the sensing levers 5, 6, the latter being rotated into their initial positions (FIG. 1) by the springs 21, 22. As a result of this movement of the levers 5, 6, the springs 27, 28 return to their maximum distensions with the stop nuts 43, 44 in engagement with the lever arms 11, 12, thereby rotating the operating levers 15, 16 clockwise to cause retraction of the connector members 7, 8 by virtue of the abutment of the ends 19, 20 of the levers 15, 16 with the shoulders 41, 42. The various parts have then resumed the initial positions shown in FIG. 1.

The present invention is specifically concerned with the construction and operation of the connector members 7, 8. One of the connector members, 7, will be described with particular reference to FIGS. 3 and 4.

The connector member 7 comprises a cylindrical casing 45 supported for rocking movement in one plane by two parallel swinging links 46 which are pivotally connected to respective lugs 45a at one end of the casing 45 by means of a pivot pin 47. The links 46 are pivoted at their opposite ends by a pivot pin 48 to two brackets 1a carried by the respective coupling head 1, shown in broken outline.

A tubular element 49 is mounted for axial sliding movement within the casing 45. The tubular element 49 bears at one end a pipe union 50 adapted for the sealed attachment of a flexible hose (not shown) connected to a pneumatic brake pipe of the vehicle. The tubular element 49 is normally locked relative to the casing 45 by a stop lever 51 pivotally mounted on a pin 52 carried externally on the casing 45, the stop lever 51 having a tooth 53 which passes through a slot in the casing 45 and engages in a notch 54 in the external surface of the tubular element 49. At its other end the tubular element 49 carries a ferrule 55 which is slidable axially upon and sealed to the external surface of the element 49 by annular seals 56 and which carries at its outer end a tubular sealing member 57 which is adapted to make sealing contact with the corresponding sealing member of an identical connector member on an adjoining vehicle. The ferrule 55 is biased outwardly, that is, in the direction of the cooperating coupling head, by a helical spring 58 interposed between the inner end of the ferrule 55 and an annular shoulder 59 on the tubular element 49. In the inoperative or decoupled condition (FIG. 3) the ferrule 55 is urged by the spring 58 into abutment with an annular lip 60 formed on the end of the casing 45.

The external shoulders 31, 41 of the connector member 7 comprise respective integral external flanges in the casing 45, the end 19 of the respective operating lever 15 being located between said flanges, as previously described with reference to FIGS. 1 and 2.

A transverse pivot pin 62 on the outer end of the casing 45 acts as a hinge support for a protective cover 63 of the connector member 7, shown in its closed position in FIG. 3. Opposite the pivot pin 62, on the same side as the shoulders 31, 41, the casing 45 carries an appendage 61 at its outer end. The appendage 61 provides an anchorage for one end of a flexible control element comprising a cable 64 which is slidable in a semirigid sheath 65. The adjacent end of the sheath 65 is anchored to the external flange which forms the shoulder 41.

In the inoperative or uncoupled condition of the connector member 7 (FIG. 3) the end 19 of the operating lever 15 abuts the shoulder 41.

When the advancing mechanism for the connector member operates, as described previously, in response to the initial contact between the sensing lever 5 and the approaching head 2 (FIG. 1) the end 19 of the lever 15 is moved to the left of FIG. 3, into abutment with the shoulder 31 (FIG. 4). The resulting leftward movement of the casing 45 induces either opening rotation of the protective cover 63 about the pivot pin 62, as will be described later with reference to FIGS. 7 and 8, or alternatively movement of the tubular elements 49 when the latter is effectively locked relative to the casing 45 by the engagement of the tooth 53 in the notch 54.

The leftward movement of the casing 45 allows movement of the ferrule 55 and hence the sealing member 57 of the connector member 7 is advanced into sealing engagement with the corresponding sealing member of the cooperating connector member, thereby effecting pneumatic coupling of the respective service pipes, for example the brake pipes, of the coupled vehicles.

When the sealing member 57 has engaged its counterpart in the cooperating connector member 8 the member 57 is pushed axially inwardly against the action of the spring 58, assuming the position shown in FIG. 4. The resiliently yieldable support for the sealing member 57 ensures a sufficient but not excessive axial thrust between the mutually contacting sealing members to guarantee satisfactory sealing therebetween when the connector members 7, 8 are fully interconnected (FIG. 2).

The abutment of the adjacent ends of the casings 45 of the coupled connector members 7, 8 pushes the end of each cable 64 rearwardly in the respective appendage 61 (FIG. 4), opening an associated cock (not shown) in the pneumatic line communicating with the respective connector member.

When the connector member 7 is in its coupled condition (FIG. 4) the tubular element 49 can be removed from the casing 45, even when the two coupling heads 1 and 2 are fully coupled (FIG. 2) provided the section of the pneumatic service line on each side of the coupled members 7, 8 is isolated by the closure of head cocks as described later. This permits inspection of the sealing member 57 and replacement thereof as and when necessary. Removal of the tubular element 49 from the casing 45 is effected after unlocking the tubular element 49 by counterclockwise rocking of the stop lever 51, after first removing a safety pin 66.

Figure 5:
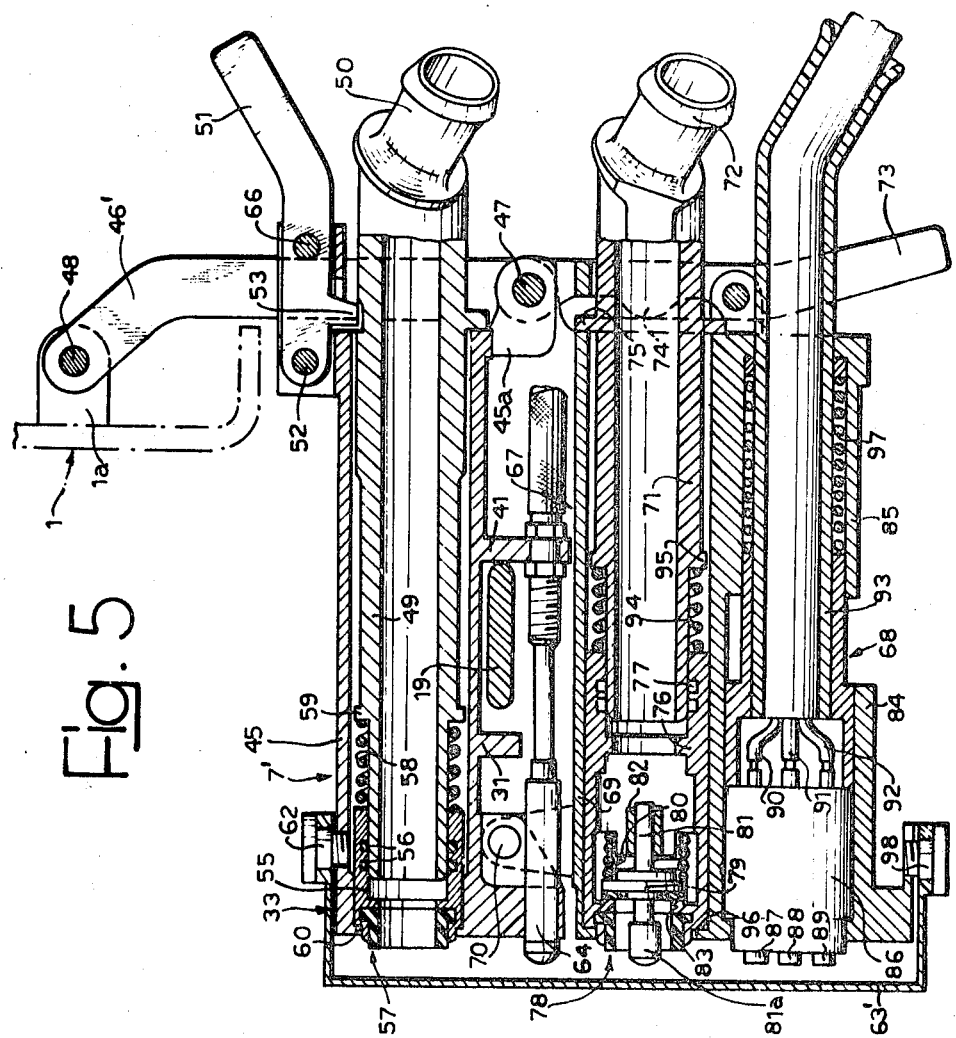
FIG. 5 is a longitudinal section, corresponding to FIGS. 3 and 4, of the assembly of connector members forming the connector device of the invention and associated with the pneumatic service conduits of the coupling head of FIGS. 1 to 4 in the uncoupled condition.
Figure 6:
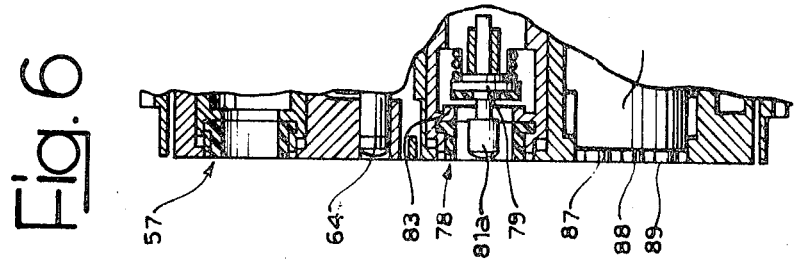
FIG. 6 is a longitudinal section of part of the assembly shown in FIG. 5 in the coupled condition.

The connector device shown in FIGS. 5 and 6 comprises an assembly of connector members. The uppermost connector member 7' is associated with a pneumatic brake pipe, and includes a tubular element 49 slidable within a cylindrical casing 45: being wholly similar to the connector member of FIGS. 3 and 4 this connector member will not be described further. Below the connector member 7', as viewed in FIG. 5, is a connector member 67 associated with a pneumatic service conduit and a connector member 68 for electrical service cables.

The pneumatic conduit connector member 67, shown in FIG. 5 in its uncoupled condition, comprises a cylindrical casing 69 pivotally connected at its outer end by way of a pivot pin 70 to the end 33 of the casing 45 of the connector member 7', the latter being in turn pivotally connected to the coupling head 1 by way of the pivot pin 47, the swinging link 46' and the pivot pin 48.

A tubular element 71 is mounted for axial sliding movement within the casing 69 and carries at its inner end a pipe union 72 similar to the pipe union 50 for connection to the pneumatic service conduit (not shown). The tubular element 71 is normally locked relative to the casing 69 by a lever 73, pivotally supported on the pivot pin 47 and having a projection 74 (shown in broken outline) which engages a shoulder 75 provided on the element 71.

A ferrule 76 is slidably mounted of the external surface of the tubular element 71 and sealed thereto by annular seals 77. The ferrule 76 carries at its outer (left-hand) end a tubular sealing member 78 adapted to make sealing contact with a corresponding sealing member on a cooperating connector member when he coupling heads 1, 2 are interengaged. A normally closed valve 79 s housed in the ferrule 76 for axial sliding movement and is carried by a stem 81 sliding within a guide 82 attached to the ferrule 76. The valve 79 is biassed by a spring 80 into sealing contact with an annular internal seat 83 formed integrally in the ferrule 76. The valve 79 carries an outwardly projecting rounded shank 81a coaxial with the stem 81.

The electrical connector member 68 comprises two coaxial tubular casings 84, 85 of different diameters integral with the casings 84, 85 of different diameters integral with the casing 69 of the service conduit connector member 67. A sliding contact-holder block 86 holds respective contacts 87, 88 and 89 for engaging corresponding contacts of a similar connecting member carried by the adjoining coupling head. The block 86 is mounted for axial sliding movement in the outer, larger diameter, housing 84. Respective electrical conductors 90, 91, 92 are connected to the contacts 87, 88, 89 and lead into the block 86 from a protective tube 93 housed in the inner, smaller diameter, housing 85.

A spring 97 carried in the casing 85 acts through an intermediate sleeve on the contact-holder block 86, urging the latter axially outwardly into engagement with its counterpart on the adjoining coupling head.

A protective cover 63' is pivotally mounted on pivot pins 62 and 98 carried externally on the casings 45 and 84. When the mechanism for controlling the advance of the connector members is advanced towards the cooperating coupling head the end 19 of the operating lever 15 displaces the shoulder 31, and, therefore, the casing 45, to the left as viewed in FIG. 5. This movement of the casing 45 will, through the pivot pins 47 and 70, be accompanied by leftward movement of the combined connector members 67 and 68, until the positions shown in FIG. 6 are reached. The leftward movement of the casing 69 of the service conduit connector members 67 induces opening rotation of the protective cover 63', drawing the tubular element 71 in the same (leftward) direction.

The leftward movement of the casing 69 and the tubular element 71 carried the shank 81a of the valve 79 into engagement with the shank of the valve of the cooperating coupling head. This results in the valve 79 (and its counterpart in the cooperating head) being pushed against the action of the spring 80 away from the seat 83, opening both abutting valves.

At the same time the leftward movement of the casings 69 and 76 and of the tubular element 71 carries the sealing member 78 into sealing contact with the corresponding sealing member 78 of the cooperating head effecting a sealed coupling between the pneumatic service conduits. The outer (left) extremity of the casing 69 will come into contact with the outer (right) extremity of the casing of the corresponding connector member of the cooperating head. In addition, the casing 84 of the electrical connector member 68, integral with the casing 69, carries the contacts 87, 88 and 89, projecting from the end of the casing 84, into contact with the corresponding contacts of the cooperating head. The reaction between the contacts causes movement to the right of the contacts 87, 88 and 89 and of the block 86 against the action of the spring 97.

The various component parts of the fully coupled connector members are then in the positions shown in FIG. 6.

FIGS. 7 and 8 illustrate the control mechanism for the protective cover 63 of the connector device of FIGS. 3 and 4, in the uncoupled and coupled conditions respectively.

An arm 100 is attached to the pivot pin 62 of the cover 63 and controls rotation of the pin 62. A stop member 101 is attached to the respective coupling head 1 and is bent over at its end to provide two orthogonal stop faces, one of which, facing rearwardly, engages the arm 100 in the closed position of the cover 63 (FIG. 7) and the other of which, facing upwardly as viewed, engages the arm 100 in the open position of the cover 63 (FIG. 8).

The cover 63 is biassed towards its closed position by a tension spring 102 attached at one end to a pin 103 integral with the casing 45 of the connector member 7 and at its other end to a pin 104 attached to the cover 63.

When the connector member 7 is in its uncoupled position, the cover 63 is held by the spring 102 in its closed position, with the arm 100 engaging the rearwardly facing surface of the stop member 101 (FIG. 7). When, however, the connector member 7 is displaced by the mechanism previously described with reference to FIG. 1 and 2 into coupling engagement with the corresponding connector member of a cooperating coupling head, the arm 100 is forced by the stop member 101 (which, being attached to the head 1, remains fixed) to rotate the pivot pin 62 anticlockwise through 90° against he action of the spring 102 moving the cover 63 into its open position (FIG. 8) in which the arm 100 engages the upwardly facing surface of the stop member 101.

When a railway vehicle provided with an automatic connector device on an automatic coupling head as described above has to be coupled to a vehicle not so provided, that is, a vehicle having manual connectors, it will be necessary, where the connector members remain in their retracted (uncoupled) positions, to open the protective cover of the or each connector member by hand, by rotating the respective pivot pin 62 manually.

FIGS. 9 and 10 illustrate a practical variant of the embodiment of FIGS. 1 and 2, in which corresponding component parts are indicated by the same reference numerals.

In the embodiment of FIGS. 1 and 2 the springs 27 and 28 for moving the operating levers 15 and 16 must also have sufficient strength to resist the tendency, when the connector members 7, 8 are coupled together and air under pressure passed therethrough, for the member 7, 8 to be forced apart. The embodiment of FIGS. 9 and 10 permits the use of spring 27 and 28 of less strength than the springs 27, 28 of FIGS. 1 and 2 by supplementing the springs 27, 28 with pneumatic actuators supplied with pneumatic pressure proportional to that supplied to the respective coupling members.

Thus referring to FIGS. 9 and 10, the connection between each respective sensing lever arm 11, 12 and the pivot pin 17, 18 on the respective operating lever 15, 16 comprises a rod 113, 114 connected at one end to the pivot pin 17, 18 and bearing at its other end a piston 105, 106 which slides in a single acting ram cylinder 107, 108. The ram cylinder is pivotally connected to the sensing lever arm 11 by way of a pivot pin 109, 110. The space 107a, 108a enclosed in each cylinder 107, 108 by the respective piston its 106 is supplied with air under pressure through a line 111, 112 connected to the respective pneumatic service pipes which lead into the connector heads, 7 8.

Each respective biassing spring 27, 28 is located within a tubular extension of the cylinder 107, 108, and bears at one end against an annular stop 115, 116 formed in the cylinder wall and at its other end against ring nut 117, 118 carried by the respective rod 113, 114.

In the uncoupled condition of the coupling heads 1, 2 shown in FIG. 9 each piston 105, 106 is held, by the action of the spring 27 28 on the respective rod 113, 114, against the stop 115, 116.

As the coupling heads 1, 2 engage each other upon approach of the vehicles to be coupled each sensing lever 5, 6 will be rotated anticlockwise against the action of its return spring 21, 22 by the engagement of the respective projection 3, 4 of the approaching head 2, 1 with respective arm 5a, 6a. This rotation of the sensing lever 5, 6 will be transmitted to the operating lever 15, 16 by the spring 27, 28. During this movement the spring 27, 28 keeps the piston 105, 106 against the stop 115, 116, so that each pair of pivot pins 17, 109, and 18, 110 remains separated by the maximum possible distance.

After coupling of the ends 33, 34 of the connector members 7, 8 has been effected, as hereinbefore described with reference to FIGS. 1 and 2, the further approach of the mechanical coupling heads 1, 2 towards each other into their final coupled condition causes further anticlockwise rotation of each sensing lever 5, 6 relative to the now immovable operating lever 15, 16 causing further compression of the spring 27, 28, accompanied by displacement of the piston 105, 106 in the respective cylinder 107, 108 away from the stop 115, 116, to the intermediate position shown in FIG. 10.

In this condition, and in the absence of pneumatic pressure applied to the interconnected pneumatic lines, each operating lever 15, 16 is subjected only to the action of the spring 27, 28, the cylinder space 107a, 108a being at atmospheric pressure.

However, as soon as pneumatic pressure is supplied to the pneumatic lines interconnected by the connector members 7 end 8, and, therefore, through the lines 111, 112 to he cylinder spaces 107a, 108a, this pressure acts on the pistons 105, 106, transmitting a force directly to the rods 113, 114 which is proportional to the said pressure, and thereby counteracting the reaction between the coupled ends 33, 34 of the connector members 7, 8 resulting from this pressure. An effective seal between the connector members 7, 8 is therefore maintained when the latter are transmitting high pneumatic pressures.

We claim:

1. In an automatic coupling head for a railway vehicle of the kind adapted to interengage automatically with a coupling head of an adjoining railway vehicle upon the approach of the vehicles, the improvement which consists in a connector device comprising at least one connector member, adapter means on the connector member for the connection thereto of a vehicle service conduit, and pivotal suspension means connecting the connector member to the coupling head for swinging movement relative thereto.

2. Connector device according to claim 1, wherein the device comprises two connector members, means suspending one said connector member from the other, said one connector member being adapted to be connected to a pneumatic service conduit, and the other said connector member being adapted to be connected to a further pneumatic service conduit such as a pneumatic brake conduit.

3. Connector device according to claim 2 wherein at least one of the pneumatic connector members is provided with a valve which is normally closed in the uncoupled condition of the device and an axial appendage carried by the valve and engageable with the corresponding appendage of a cooperating said connector member in the coupled condition of the device.

4. Connector device according to claim 1 wherein the connector member comprises a casing, a swinging suspension pivotally connecting the casing to the coupling head, at least one tubular element adapted to be connected to a pneumatic line and mounted for axial sliding movement within the casing, said tubular element carrying a sealing member adapted to make sealing contact with a corresponding sealing member on a cooperating connector member, and resilient means interposed between the casing and the tubular element and urging the latter relatively to the casing towards the cooperating coupling head.

5. Connector device according to claim 4, including a flexible elongated member and a semirigid guide in which said member slides, said member being adapted to control the operation of a cock in said pneumatic line, and said elongated member projecting beyond the end of the connector member so as to be displaced when the connector member is coupled to a cooperating said connector member on the adjoining coupling head.

6. Connector device according to claim 1, wherein, the device comprises at least two connector members, one of which is an electrical connector member comprising a casing, a contact-bearing block carried slidingly in the casing and resilient return means which in use of the device urge the block towards engagement with corresponding contacts of a cooperating said connector member on the adjoining coupling head.

7. Connector device according to claim 1, wherein the connector member is provided with a rotatably mounted protective cover spring, means biassing the cover into a closed position when the connector member is not coupled, and means moving the cover against the biassing spring into an open position by the forward movement of the connector member relative to the coupling head upon coupling of the connector member with its counterpart in the other coupling head.

8. Connector device according to claim 7, wherein the means moving the cover comprises a lever arm attached to the protective cover, and a stop member, the lever arm being positively engaged by the stop member in both the open and closed positions of the cover.

9. Connector device according to claim 1, including an operating lever arranged to move the connector member relative to the coupling head into engagement with its counterpart on a cooperating said coupling head, means pivotally mounting an operating lever on the coupling head, a sensing lever pivotally mounted on the head, and resilient connection means interconnecting the sensing lever and the operating lever, the sensing lever being rocked in response to contact of the sensing lever with the cooperating coupling head upon advance of the coupling heads into coupling engagement to drive the operating lever.

10. Connector device according to claim 9, wherein the means pivotally mounting the operating lever provide a common pivot axis for the sensing lever and the operating lever.

11. Connector device according to claim 9, adapted to interconnect pneumatic lines, wherein the resilient connection means include pneumatic actuator means for exerting a force on the connector member urging it towards its counterpart on the cooperating coupling head when the connector members are coupled and transmitting pneumatic pressure.

12. Connector device according to claim 11, wherein the pneumatic actuator means have a pneumatic line connected thereto and supplying pneumatic pressure from the lines to be coupled, whereby the force imparted to the connector member is proportional to said pressure.